United States Patent Office 3,833,606
Patented Sept. 3, 1974

3,833,606
PREPARATION OF INDAZOLES
Arthur Gaudens Mohan, Somerville, N.J., assignor to American Cyanamid Company, Stamford, Conn.
No Drawing. Filed June 13, 1972, Ser. No. 262,426
Int. Cl. C07d 49/18
U.S. Cl. 260—310 C
8 Claims

ABSTRACT OF THE DISCLOSURE 2-alkyl- and 2-aryl-2H-indazoles are prepared by heating an N-(o-nitrobenzylidene)amine in an inert solvent in the presence of iron carbonyl.

---

This invention relates to an improved process for preparing 2-alkyl- and 2-aryl-2H-indazoles by heating, in an inert solvent in the presence of iron carbonyl, an N-(o-nitrobenzylidene)amine. These products are known compounds, known to be useful as intermediates for the preparation of dyes and optical brighteners.

The process of this invention can be illustrated as follows:

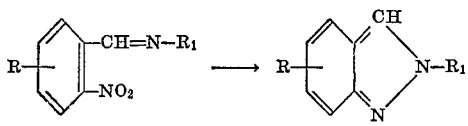

wherein R is a substitutent which is inert (i.e., does not react with any of the materials present and does not interfere with the illustrated reaction under the reaction conditions), such as hydrogen, halogen, hydroxy, alkyl, aryl, and alkoxy and wherein $R_1$ is an alkyl or aryl (such as phenyl or naphthyl) which may contain inert substituents, such as R. Since the substitutents R and $R_1$ do not participate in the reaction, so far as the process of this invention is concerned, it does not matter what inert substituents are present. However, depending on the particular use to which the indazole product is to be put, certain substituents may be preferred, such as R being hydrogen, halogen, hydroxy, alkyl of 1–18 carbon atoms, or alkoxy of 1–6 carbon atoms and $R_1$ being lower alkyl of 1–6 carbon atoms, phenyl, or naphthyl, each of which may have one or two R substituents thereon.

This process is performed by heating the N-(o-nitrobenzylidene)amine in an inert solvent in the presence of iron carbonyl. The iron carbonyl compounds include iron pentacarbonyl, diiron nonacarbonyl, and triiron dodecacarbonyl. The iron carbonyl can be used alone as such, although it is preferably used in combination with carbon monoxide gas under pressure, or generated *in situ* by use of iron and carbon monoxide gas under pressure. If the iron carbonyl is used alone, the amount must be sufficient to provide at least the required carbon monoxide equivalents needed. If the iron carbonyl is used in combination with excess carbon monoxide gas under pressure, only a catalytic amount of the iron carbonyl need be present. If the iron carbonyl is generated *in situ* from iron and excess carbon monoxide gas under pressure, only sufficient iron is needed to generate a catalytic amount of iron carbonyl, although excess iron is not harmful. Thus, while the exact amount of iron carbonyl present is not critical, usually at least 0.005 mole and preferably at least 0.05 mole is used per mole of N-(o-nitrobenzylidene)amine. While the maximum amount used is very low when carbon monoxide gas under pressure is used, when used alone much more, up to 5 moles and preferably up to 2.5 moles per mole of N-(o-nitrobenzylidene)amine is used.

The solvents in which this process is performed are inert under the reaction conditions. Illustrative of the inert solvents useful for this process are aromatic hydrocarbons such as benzene, toluene, xylene, naphthalene, etc.; aliphatic hydrocarbons such as hexane, heptane, octane, kerosine, decalin, cyclohexane, etc.; and halogenated aliphatic and aromatic hydrocabons, such as chlorobenzene, dichlorobenzene, ethylene dichloride, chloroform, tetrachloroethylene, etc. The specific solvent chosen is not critical so long as it is inert (i.e., does not react or interfere with the illustrated desired reaction under the reaction conditions).

The reaction temperature should be at least about 100° C., preferably at least about 130° C. and up to a temperature of about 250° C. or the boiling point of the inert solvent under the reaction pressure conditions. Although the reaction can be conducted in the presence of iron carbonyl alone, it is preferable to use iron carbonyl or iron in the presence of carbon monoxide gas under a pressure which may be between about 50 and about 10,000 pounds per square inch gauge, preferably between 200 and 1000 pounds per square inch gauge being recommended.

The N-(o-nitrobenzylidene)amine which can be converted to the 2-alkyl- or 2-aryl-2H-indazole by the process of this invention may have inert substituents thereon, as pointed out previously. Illustrative of these compounds are N-(o-nitrobenzylidene)aniline, N - (3-methyl-2-nitrobenzylidene)aniline, N - (4-chloro - 2 - nitrobenzylidene) aniline, N - (o-nitrobenzylidene)p-chloroaniline, N - (o-nitrobenzylidene) - o-chloroaniline, N - (o-nitrobenzylidene) - m - chloroaniline, N - (o-nitrobenzylidene) - m-bromoaniline, N-(o-nitrobenzylidene)-o-anisidine, N-(o-nitrobenzylidene) - p-anisidine, N-(o-nitrobenzylidene)-o-toluidine, N - (o-nitrobenzylidene)-m-toluidine, N - (o-nitrobenzylidene)-p-toluidine, N - (o-nitrobenzylidene)-o-hydroxyaniline, N-(o-nitrobenzylidene)-p-hydroxyaniline, N - (o-nitrobenzylidene)-1-naphthylamine, N-o-nitrobenzylidene) - 2 - naphthylamine, N-(o-nitrobenzylidene)-2-hydroxy - 1 - naphthylamine, N-(o-nitrobenzylidene)-4-hydroxy - 1 - naphthylamine, N - (o-nitrobenzylidene) methylamine, N - (o - nitrobenzylidene)ethylamine, etc. These N-(o-nitrobenzylidene)amines can be prepared by well-known procedures, such as by reacting an o-nitrobenzaldehyde with a primary amine.

The reaction is continued until it is substantially completed, i.e., until substantially all the N-(o-nitrobenzylidene)amine has been converted to the 2-alkyl- or 2-aryl-2H-indazole as determined by analysis by vapor phase chromatography, etc. After removal of the precipitated iron compounds, the indazole product can be isolated by conventional methods, such as by crystallization, extraction, chromatography, etc. Since the indazole products are obtained in high purity with good yields, difficult and expensive purification procedures for removal of byproducts are not required with this process.

The following examples will serve to illustrate, but not to limit, this invention.

EXAMPLE 1

Preparation of 2-phenyl-2H-indazole

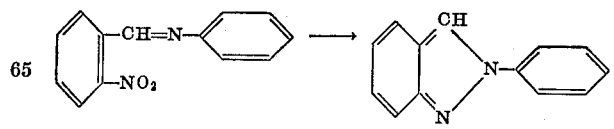

A pressure vessel is charged with 2.26 grams (0.01 mole) of N - (o - nitrobenzylidene)aniline, 0.73 gram (0.0037 mole) of iron pentacarbonyl, and 100 milliliters of benzene. The vessel is purged with carbon monoxide and then pressurized to 200 pounds per square inch gauge with carbon monoxide. The vessel is heated to 200° C. and the temperature is maintained for one hour at a pressure of 500 p.s.i.g. After the vessel is cooled to room temperature and vented, analysis of the reaction mixture indicates that none of the starting N-(o-nitrobenzylidene)aniline remains. The solvent is evaporated and the residue is extracted with hot ethanol. Partial evaporation of the ethanol and addition of water causes precipitation of the crude product. After recrystallization from aqueous methanol, the product appears as white needles, melting point 80–81° C. The product is identified by comparison of melting point, infrared spectrum, and vapor phase chromatographic data with a sample of authenic material. The authentic material for comparison can be prepared by the method of Cadogan (J. Chem. Soc. *1965*, 4831).

EXAMPLES 2–10

When the procedure of Example 1 is followed, except that 0.01 mole of the indicated N-(o-nitrobenzylidine) amine is substituted in lieu of the N-(o-nitrobenzilidine) aniline, the following 2-alkyl- and 2-aryl-2H-indazoles are obtained:

| Ex. | Amine compound | Indazole |
|---|---|---|
| 2 | N-(3-methyl-2-nitrobenzylidine) aniline. | 7-methyl-2-phenyl-2H-indazole. |
| 3 | N-(4-chloro-2-nitrobenzylidine) aniline. | 6-chloro-2-phenyl-2H-indazole. |
| 4 | N-(o-nitrobenzylidine)-m-chloroaniline. | 2-(m-chlorophenyl)-2H-indazole. |
| 5 | N-(o-nitrobenzylidine)-m-toluidine. | 2-(m-tolyl)-2H-indazole. |
| 6 | N-(o-nitrobenzylidine)-p-anisidine. | 2-(p-methoxyphenyl)-2H-indazole. |
| 7 | N-(o-nitrobenzylidine)-p-hydroxyaniline. | 2-(p-hydroxyphenyl)-2H-indazole. |
| 8 | N-(o-nitrobenzylidine)-2-naphthylamine. | 2-(2-naphthyl)-2H-indazole. |
| 9 | N-(o-nitrobenzylidine)-4-hydroxy-1-naphthylamine. | 2-(4-hydroxy-1-naphthyl)-2H-indazole. |
| 10 | N-(o-nitrobenzylidine)-ethylamine. | 2-ethyl-2H-indazole. |
| 11 | N-(o-nitrobenzylidene)-m-bromoaniline. | 2-(m-bromophenyl)-2H-indazole. |
| 12 | N-(o-nitro-p-methoxybenzylidene)aniline. | 2-phenyl-6-methoxy-2H-indazole. |
| 13 | N-(o-nitro-m-hydroxybenzylidene)aniline. | 2-phenyl-7-hydroxy-2H-indazole. |
| 14 | N-(2-nitro-5-methylbenzylidene)aniline. | 2-phenyl-5-methyl-2H-indazole. |

I claim:
1. A process for preparing an indazole of the formula

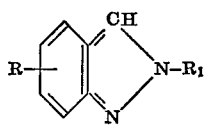

which comprises heating, in an inert solvent in the presence of iron carbonyl, an N-(o-nitrobenzylidene)amine having the formula

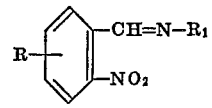

wherein R is hydrogen, halogen, hydroxy, alkyl of 1–18 carbon atoms, or alkoxy of 1–6 carbon atoms and $R_1$ is lower alkyl of 1–6 carbon atoms, phenyl, or naphthyl, each of which may have one or two R substituents thereon, said iron carbonyl being used (a) in an amount sufficient to provide at least the required carbon monoxide equivalents needed or (b) in a catalytic amount of at least 0.005 mole of iron carbonyl per mole of said N-(o-nitrobenzylidene)amine in combination with excess carbon monoxide under pressure.

2. A process as defined in claim 1 wherein a temperature between 100° C. and 250° C. is used.

3. A process as defined in claim 1 wherein the iron carbonyl is selected from iron pentacarbonyl, diiron nonacarbonyl, and triiron dodecacarbonyl.

4. A process as defined in claim 1 wherein said iron carbonyl is used in an amount sufficient to provide at least the required carbon monoxide equivalents needed.

5. A process as defined in claim 4 wherein up to 5 moles of iron carbonyl per mole of N-(o-nitrobenzylidene)amine is used.

6. A process as defined in claim 1 wherein said iron carbonyl is used in a catalytic amount of at least 0.005 mole of iron carbonyl per mole of said N-(o-nitrobenzylidene)amine in combination with excess carbon monoxide under pressure.

7. A process as defined in claim 6 wherein the iron carbonyl is formed in situ from iron and excess carbon monoxide.

8. A process as defined in claim 6 wherein a pressure of 50 p.s.i.g. to 10,000 p.s.i.g. is used.

References Cited

Cadogan et al., J. Chem. Soc. (London) 1965, pp. 4831–7.
Dann et al., Chem. Abst., vol. 60, column 6361 (1964).
Elderfield Heterocyclic Compounds, vol. 5, p. 166, N.Y., Wiley, 1957.
Horie, Chem. Abst., vol. 55, columns 5510–11 (1961).
Krbechek et al., Chem. Abst., vol. 61, column 3091 (1964).
Schwan et al., J. Pharm. Sci., vol. 57, pp. 877–8 (1968).
Wiley et al., Pyrazoles, Pyrazolines, Pyrazolidines, Indazoles and Condensed Rings, pp. 303, 304 and 320–22, N.Y., Interscience-Wiley, 1967.

NATALIE TROUSOF, Primary Examiner

U.S. Cl. X.R.
260—566 R